United States Patent [19]
Gazeley

[11] Patent Number: 5,670,263
[45] Date of Patent: Sep. 23, 1997

[54] TREATMENT OF RUBBER ARTICLES

[75] Inventor: Keith Frederick Gazeley, Hertford, United Kingdom

[73] Assignee: Tun Abdul Razak Research Centre, Hertford, United Kingdom

[21] Appl. No.: 408,136

[22] Filed: Mar. 21, 1995

Related U.S. Application Data

[63] Continuation of Ser. No. 140,301, Oct. 22, 1993, abandoned.

[30] Foreign Application Priority Data

Oct. 23, 1992 [GB] United Kingdom .............. 92 22 292.6

[51] Int. Cl.$^6$ .............................. B32B 25/04; B32B 25/12
[52] U.S. Cl. .................. 428/492; 428/500; 428/515; 428/522; 427/413; 427/421; 427/372.2; 525/165; 525/166; 124/77; 124/502; 124/503; 2/159; 2/167; 2/168; 2/DIG. 7
[58] Field of Search .................... 428/492, 500, 428/515, 522; 427/413, 421, 372.2; 2/159, 167, 168, DIG. 7; 524/77, 502, 503; 525/165, 166

[56] References Cited

U.S. PATENT DOCUMENTS

| | | |
|---|---|---|
| 3,856,561 | 12/1974 | Esemplare et al. . |
| 4,070,713 | 1/1978 | Stockum . |
| 4,199,490 | 4/1980 | Kamita et al. .................... 524/505 |
| 4,499,154 | 2/1985 | James et al. ..................... 428/494 |

FOREIGN PATENT DOCUMENTS

| | | |
|---|---|---|
| 0 105 613 | 11/1988 | European Pat. Off. . |
| 1 452 366 | 10/1976 | United Kingdom . |
| 1 492 330 | 11/1977 | United Kingdom . |

*Primary Examiner*—James J. Seidleck
*Assistant Examiner*—Dvc Truong
*Attorney, Agent, or Firm*—Wenderoth, Lind & Ponack

[57] ABSTRACT

Rubber articles e.g. rubber latex gloves have an adherent anti-tack coating comprising a mixture of a) a carboxylated synthetic rubber latex having a minimum film forming temperature (MFFT) of 10° C. or above, with b) a latex polymer having an MFFT below 10° C. and/or c) a water-soluble organic polymeric hydroxy material. Component b) tends to confer non-slip properties while component c) tends to confer lubricating properties.

7 Claims, 1 Drawing Sheet

TREATMENT OF RUBBER ARTICLES

This application is a continuation of now abandoned application Ser. No. 08/140,301, filed Oct. 22, 1993.

This invention is concerned with rubber articles, and with the provision of an anti-tack coating for controlling the residual tack of articles, particularly rubber gloves, produced from latex. In various formulations, this desired low-tack property is combined with low friction under dry or wet conditions or with high friction.

It is well known that articles produced from latex, in particular natural rubber latex, tend to have surfaces with a degree of residual tack. If this is untreated, subsequent handling becomes very difficult due to the tendency of contiguous surfaces to stick together. To prevent this adhesion it is common practice to treat such surfaces with a fine powder such as talc or starch.

In an alternative method the surface of the article is treated chemically, usually by chlorination, by immersion in an aqueous solution of chlorine.

In a third method, the surfaces are treated with silicone oil.

These methods have certain disadvantages in some applications. Powders give tack reduction and aid lubrication or slip as in the action of donning a glove. However it is understood that powders on surgeons gloves can cause medical complications if they enter into body cavities during operations.

Chlorination is difficult to control with thin articles such as medical gloves and can give rise to discolouration and oxidation.

Silicone oil reduces tack but does not promote lubrication unless used in excessive quantities which would be unpleasant on gloves.

Proposals have been made to overcome these difficulties. U.S. Pat. No. 4,070,713 teaches the use of a slip coating of particulate lubricant embedded in a carboxylated SBR binder. Other proposals have been made for slip coatings based on combinations of synthetic vinyl copolymers (BP No. 1,452,366).

European patent specification 105,613 describes flexible rubber articles such as rubber gloves, including a bonded lubricating layer formed from a hydrogel copolymer based on 2-hydroxyethylmethacrylate with methacrylic acid and/or 2-ethylhexylacrylate. The rubber gloves may need to be primed by means of a dilute acid and an aluminium salt, and the hydrogel polymer is then applied from alcoholic solution which is inconvenient. In another separate step a top coating of a surfactant, including non-ionic surfactants, optionally containing a silicone oil, is applied to the hydrogel polymer. It is claimed that the hydrogel improves the dry skin lubricity and that the surfactant top coating improves the wet skin lubricity.

Polymers having the best low-friction characteristics tend to be relatively hard materials with limited elongation. Coatings from such materials applied to rubbery articles tend to crack and flake off when the rubber is stretched to any significant extent. The roughening effect produced by crack formation tends to reduce the area of contact and therefore has a beneficial effect on lubrication but the flaking off is a disadvantage.

This invention is based on the discovery that the adhesion and resistance to flaking of anti-tack coatings based on certain hard polymers is greatly improved by the addition of another component. The invention thus provides in one aspect an article of rubber having a surface provided with an adherent anti-tack coating which coating comprises a mixture of a) a carboxylated synthetic latex polymer having a minimum film-forming temperature (MFFT) of 10° C. or above, with b) a synthetic or natural latex polymer having a minimum film-forming temperature of 10° C. or below and/or c) a partly or wholly water-soluble organic polymeric hydroxy material.

Component a), the carboxylated synthetic latex polymer with a relatively high MFFT, provides anti-tack properties, and generally also low friction properties. Either component b), the latex polymer with a relatively low MFFT, or component c), the organic polymeric hydroxy material, or a mixture of components b) and c), improves the adhesion and resistance to flaking. Depending on the formulation component b) can provide high-friction properties in the anti-tack coatings. Component c) can provide low-wet-friction properties on the coating.

The rubber articles are preferably of latex rubber, i.e. articles produced from rubber latex, particularly natural rubber latex. The invention is particularly concerned with rubber gloves, such as surgeons gloves and gloves used by doctors and veterinary surgeons for examination purposes, and also to other latex rubber articles which need to be treated to remove surface tack and/or modify surface friction. Examples are condoms, catheters, sheath-type incontinence devices and sheeting. The requirement may be for low friction, giving lubrication, as on the inside surface of a glove; or for high friction, giving good grip, as on the outside surface of a glove. In these cases the friction requirements are differentiated from the ever-present need for low tack. For the required variation in friction it is advantageous to add a low MFFT synthetic latex polymer as component b) which confers high friction. The friction of the anti-tack coating in dry and wet conditions may be altered by suitable adjustment of the blend ratio of the components.

The carboxylated synthetic latex polymer a) used in the anti-tack coating preferably has low friction characteristics. The coating generally has a coefficient of friction below 1.0 preferably below 0.5, when measured by the test described below. Such polymers tend to be relatively hard. Typically their minimum film forming temperature is in the region of 10° C. or above, although for the best low friction characteristics a MFFT of 15° C. or more is preferred. Suitable polymers include acrylic copolymers, vinyl copolymers, and particularly carboxylated styrene-butadiene polymers. Among carboxylated styrene-butadiene polymers, those with a rather high styrene content tend to be harder and are preferred. The presence of pendant carboxyl groups may increase polymer hardness. Carboxylated styrene-butadiene polymers, are particularly preferred and are widely available in latex form. Other possible polymers include carboxylated nitrile butadiene and carboxylated polychloroprene rubber latices.

One function of the partly or wholly water-soluble organic polymeric material c) is to improve the adhesion of the anti-tack coating to the rubber surface without significantly spoiling the low-friction characteristics of the coating. It has been found also that in suitable cases the hydrophilic additive substantially modifies the cracking behaviour of the polymer coating, so that on stretching the rubber substrate, the tendency of the polymer coating to form large, easily visible flakes, is much reduced.

It is not clear whether the effect of the additive is to increase genuinely the bond strength between the coating and the substrate or, by modifying the cracking pattern, to reduce the peeling forces which lead to flaking and loss of the coating. Subjective observations indicate that both effects are significant. In any event, the net result is a considerable reduction in the tendency of the coating to be removed by flaking and abrasion when the article is subjected to normal use.

A second function of the hydrophilic additive c) is to reduce the friction of the rubber substrate against wet surfaces. This may be advantageous in some circumstances and not in others. For example, low wet friction is useful for catheters, but not on the exterior surface of a glove where it could reduce the ability to grip wet objects.

Preferred hydrophilic additives c) are synthetic organic materials, particularly those containing a plurality (two or more) hydroxyl groups. Suitable materials include polyvinyl alcohols, polyalkylene oxides such as polyethylene oxide, and poly-hydroxyalkyl acrylates and methacrylates such as poly-hydroxyethyl methacrylate. The concentration of the material should be large enough to improve adhesion of the anti-tack coating to the substrate, but not so large as to substantially impair the low friction properties of the coating. Preferably, the weight ratio of synthetic latex polymer a) to water-soluble organic polymeric material c) in the anti-tack coating is from 0.25:1 to 20:1 or even 50:1.

An anti-tack coating for use in the invention may be an aqueous carboxylated synthetic polymer latex a) containing also the partly or wholly water-soluble organic polymeric material c). In the case of materials which are readily available commercially, such as polyvinyl alcohol, the material is dissolved in water at the required dilution and then mixed with the synthetic polymer latex also at required dilution. Materials such as hydroxyethyl methacrylate, normally available in monomeric form, may be mixed with the synthetic polymer latex and polymerised in situ. The aqueous anti-tack coating may be used suitably at a total solids content in the range of 3 to 30%.

As noted above, the friction characteristics of coatings containing a low MFFT synthetic or natural latex polymer depend on the nature of the said component b). Preferred materials are unvulcanised or vulcanised natural rubber latex and styrene-butadiene copolymers with MFFT below 10° C. Typically, suitable materials will have a glass transition temperature below 0° C. The proportion of this component in the composition will depend on the required properties of the coating; typically the variation will be from zero to 85% by weight, preferably 10-50%, of the non-volatile components a), b) and c).

A combination of a carboxylated synthetic polymer latex (a) with a natural rubber latex (b) gives coatings which have low tack, low friction and good bonding suitable for donning gloves. These coatings are not preferred for outside coatings or gloves because of their low friction, which reduces the ability to grip objects.

There is a need for a coating with low tack and reasonably high friction for use, for example, on the outside of gloves. A combination of a carboxylated synthetic polymer latex (a) with a low MFFT synthetic polymer latex gives coatings which show this effect. Low MFFT synthetic polymer latices may be reinforced during manufacture by co-agglomeration with polystyrene latex.

The invention also includes a method of making an article as described, which method comprises applying to a rubber substrate, e.g. by dipping, spraying or electrostatic coating, an anti-tack coating as described.

The process of the invention is particularly suitable for rubber gloves commonly made by latex dipping. An article according to the invention may be made by the following steps.

i) Forming a rubber article by one of the conventional methods known to those skilled in the art in which a former is dipped into rubber latex. These methods are commonly referred to as straight dipping, coagulant dipping, or heat sensitised dipping.

ii) Dipping the article into the anti-tack coating.

iii) Heating the article to dry and if necessary vulcanise the rubber.

iv) Stripping the article form the former.

As part of the manufacturing process, the article be may reversed, inside to outside, due to the method by which it is stripped from the former. This is the usual condition for some types of latex gloves. Anti-tack coatings applied to the outside of the glove before stripping will form the inside surface during use. In such cases, coatings which are to form the final outer surface must be applied as a preliminary treatment of the former or as an after-treatment to the article after stripping. Coatings applied to the former must allow stripping to occur with no adhesion to the former, otherwise damage will occur.

Reference is directed to the accompanying drawings in which.

Figure 2:
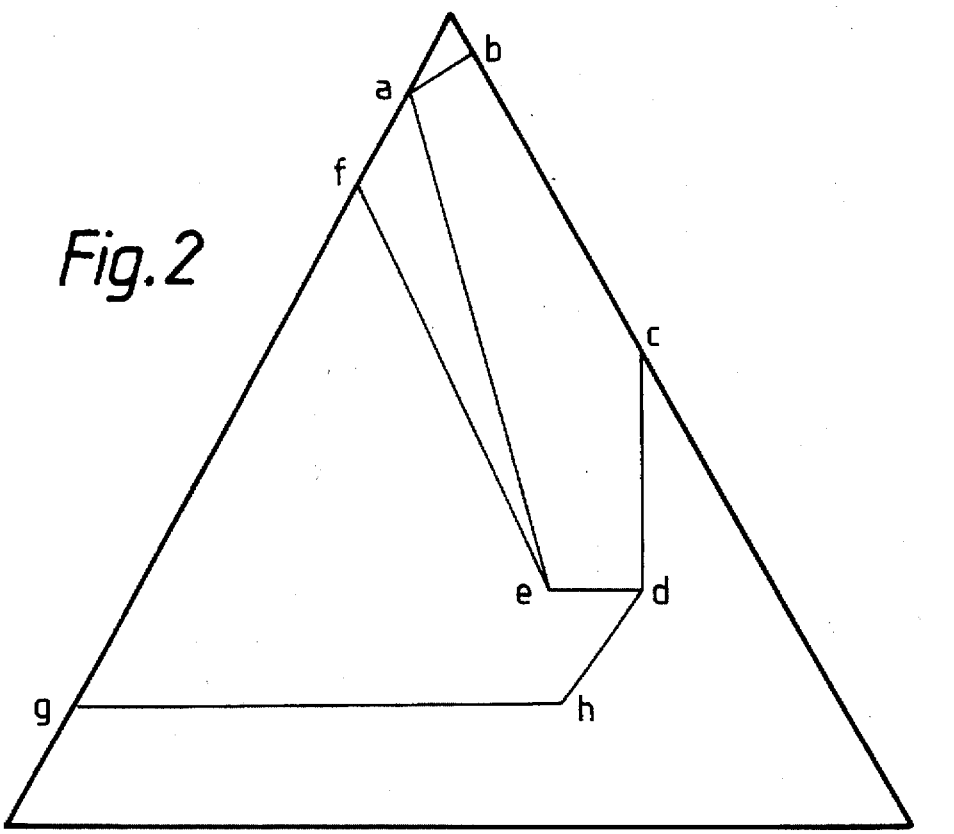
FIG. 2 is a three component diagram.

Referring to FIG. 2, the three apexes of the triangle are labelled Component A, Component B and Component C, and represent compositions consisting of 100% of Component A, Component B and Component C respectively. The proportions of the components represented in the diagram are by weight.

The area abcdef represents preferred compositions for anti-tack lubricating coatings. The area deagh represents preferred compositions for anti-tack coatings with good grip.

The composition lines shown apply to the specific materials used in the examples. There is some variations in these areas with variation in the raw materials used. For example, the composition of Example 9 below comes close to the point a. This is a non-slip coating, made using a relatively soft synthetic latex for Component B. If a harder natural rubber latex had been used as Component B, the same formulation could have been made to provide good slip properties.

The following examples illustrate the invention. Examples 1 and 5 are comparative.

EXAMPLE 1

A clean porcelain glove former was dipped into a 10% solution of calcium nitrate and then removed, allowing excess solution to drain. After drying for 30 secs at 70° C. the former was dipped into a prevulcanised latex (45% TSC) for 10 secs and then removed and part dried for 2 mins at 70° C. The former and gelled film were then dipped for 10 seconds into a suitable carboxylated styrene-butadiene latex diluted to 5% TSC. The CSBR latex used had a styrene content in the region of 70% and a MFFT of 25° C., and is sold commercially under the name Baystal T310C. After removing from the CSBR latex the former was dried at 70° C. The rubber glove was removed from the former with reversal so that the anti-tack coating was on the inside.

Opposing surfaces were found to slip easily with respect to each other, and the glove was easily donned without the aid of any additional lubricant. However, it was found that stretching the glove induced cracking and flaking of the coating and that the flakes so formed were removable by peeling and abrasion.

EXAMPLE 2

A glove was made according to the process above except that in this case the anti-tack coating was prepared by mixing one volume of the diluted CSBR latex (5% TSC) with one volume of an aqueous solution (2% w/w) of polyvinyl alcohol. The rubber glove prepared in this way showed low friction characteristics as in Example 1 but there was no flaking or peeling of the coating when the glove was stretched in use.

EXAMPLE 3

A glass tube of approx 25 mm diameter by 135 mm long was fitted with a suitable rubber bung at each end and a metal rod of 3 mm diameter was placed through holes bored centrally in the bungs so as to form an axis. The rod protruded from the bungs at each end by about 30 mm so that the assembly could be supported and rotated as required. The tube assembly was dipped into a 30% solution of calcium nitrate to a depth which covered the tube and then removed and excess coagulant allowed to drain. After drying the tube was immersed into pre-vulcanised NR latex for 30 seconds and then removed and part dried for 1 min at 70° C. The tube and latex gel was them immersed for 10 seconds into a suitable latex anti-tack coating as described in Example 2. After drying at 70° C., the sample was allowed to cool.

Figure 1:
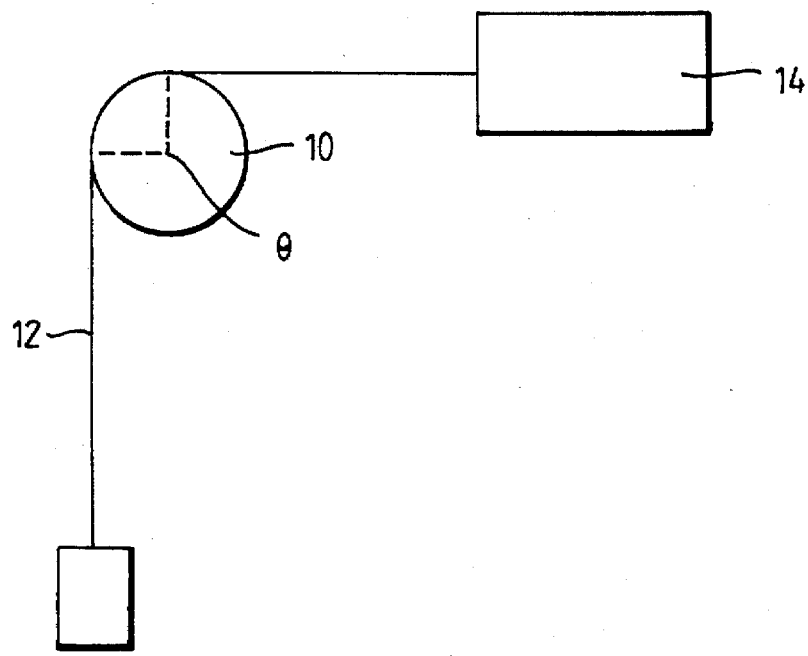
FIG. 1 shows a test apparatus to measure surface friction.

The rubber covered tube was then placed in a test apparatus to measure the surface friction. The essential elements of the apparatus are shown in FIG. 1. The tube (10) was rotated at a suitable speed against a 2.5 cm wide tape (12) cut from good quality coated paper and the force indicated on the force-gauge (14) was noted. From a knowledge of the forces involved and the contact angle, the friction can be calculated by the following equation (Kempe's Engineers Year-book 1990 Vol. 1, pA3/13 Morgan-Grampian Book Publishing Co. Ltd., London).

$$\mu = \frac{\ln T_1 - \ln T_2}{\Theta}$$

where $\Theta$ is the contact angle in radians.

When this process was repeated a number of times the coefficients of friction ($\mu$) was found to be in the range 0.2–0.4.

EXAMPLE 4

The process of Example 3 was repeated without applying the anti-tack coating, the previous stage terminating with drying the article at 70° C. Samples prepared in this way were tested as in Example 3. The coefficient of friction in these tests was found to vary from about 1.5 to 3. Accurate figures were sometimes difficult to obtain due to the tendency to stick-slip friction.

EXAMPLE 5

Test samples were prepared as in Example 4 but after drying the assemblies were immersed in an aqueous solution of chlorine of 0.5% w/v nominal strength, for periods of 1, 2 and 3 minutes. The samples were then rinsed in water and dried. Tests on these samples gave the following coefficients of friction ($\mu$).

| Time of chlorine treatment | $\mu$ |
| --- | --- |
| 1 min | 1.6 |
| 2 min | 0.7–1.3 |
| 3 min | 0.2–0.3 |

These tests show that the anti-tack coatings of the invention can give low friction comparable with the commonly used method of chlorination.

EXAMPLE 6

To 280 gm CSBR latex (Baystal T310C) at 50% solids was added 66 gm 2% w/w aqueous ammonia. A mixture of 0.35 gm t. butyl hydroperoxide (70% activity) and 7.5 gm 25% w/w Texofor FN30 (a non-ionic surfactant) was stirred in. This was followed by 7.0 gm hydroxy-ethylmethacrylate and 1.5 gm 10% tetraethylene pentamine. The soft gel which formed within 10 minutes which was redispersed by stirring with 250 mls water. The mixture was allowed to stand for 24 hours. An anti-tack coating was prepared by adding one part of the above mix to three parts of water. A test sample was prepared on a glass tube as described in Example 3 but in this case the above anti-tack coat mix was used.

The sample was tested in the manner already described giving a friction coefficient of 0.24.

EXAMPLE 7

A glove was made according to the process described in Example 1. However in this case the anti-tack coating was prepared by mixing one volume of diluted CSBR latex at 5% TSC with one volume of 2% w/w aqueous solution of polyethylene oxide and 0.33 volumes water. The glove was subsequently dried and stripped from the former as in Example 1. The glove showed the low friction characteristics of Example 1 but without the flaking of the anti-tack coating.

EXAMPLE 8

To 83 gm of a 60% solids prevulcanised natural rubber latex (MFFT <10° C.) sold commercially under the trade-name MR Revultex was added 417 gm water. To 750 gm CSBR latex (Baystal T310C) at 50% solids was added 3730 gm water and 20 gm of a 25% aqueous solution of a non-ionic surfactant sold under the trade-name of Texofor A30. The two diluted latices were then mixed together with stirring. A glove was made according to the process described in Example 1 but in this case the slip coating mixture above was used. The glove was stripped from the former with reversal so that the coating was on the inside of the glove.

The coefficient of friction of the inner surface of the glove was measured with the MRPRA friction tester, a computer controlled machine based on the method described in references 1 and 2. The coefficient was found to be 0.4 against glass and 0.3 against paper.

EXAMPLE 9

A sample of a styrene-butadiene latex (MFFT <10° C.) sold commercially under the name Intex 2003 was diluted to 10% solids content. One part by volume of this were mixed with nine parts by volume of a CSBR latex sold under the name Baystal T310C, which had also been diluted to 10% solids content. An unglazed porcelain glove former was dipped briefly into the above anti-tack coating mixture, withdrawn carefully and the coating dried for 3 minutes at 70° C. The former was then dipped into a 10% solution of calcium nitrate, withdrawn in the usual way and the solution dried for 2 minutes at 70° C. Then the former was dipped into a prevulcanised natural rubber latex of 45% solids content for 20 seconds, withdrawn and the resulting gel part-dried for 2 to 3 minutes at 70° C. The gel was leached for 2 minutes in water at 60° C. after which surface water was removed by drying for 4 minutes at 70° C. The former was dipped next into a coating mix similar to that described in Example 2 and then removed and dried at 70° C. The glove was stripped from the former with reversal.

The outside surface of the glove was not tacky, i.e. there was no adhesion between contacting surfaces, but it was found to confer a good grip during use with a variety of objects and surfaces including wet glass. The coefficient of friction of the outer surface of the glove was found to be 0.8 when measured against glass using the MRPRA friction tester.

REFERENCES

1. "Surface treatment of Rubber to reduce friction", A. D. Roberts and C. A. Brackley, J. Natural Rubber Research, vol 4, number 1, March 1989, pp 1–21.

2. "Surface treatments to reduce friction: rubber glove applications", A. D. Roberts and C. A. Brackely, Rubber Chemistry and Technology, vol 63, number 5, Nov–Dec 1990, pp 722–733.

I claim:

1. An article of rubber having a surface provided with an adherent anti-tack coating which coating comprises a mixture of: a carboxylated synthetic rubber latex polymer having a film forming temperature (MFFT) of 10° C. or above; with a partly or wholly water-soluble organic polymeric hydroxy material; the weight ratio of the said carboxylated synthetic rubber latex polymer to the said partly or wholly water-soluble organic polymeric hydroxy material in the anti-tack coating being from 0.25:1 to 20:1.

2. An article as claimed in claim 1 which is of natural latex rubber.

3. An article as claimed in claim 1 which is a glove.

4. An article as claimed in claim 1, wherein the carboxylated synthetic rubber latex polymer a) is a carboxylated styrene butadiene rubber.

5. An article as claimed in claim 1, wherein the water-soluble organic polymeric material c) is a polyhydroxy material.

6. An article as claimed in claim 5, wherein the polyhydroxy material is selected from polyvinyl alcohol, polyalkylene oxides and poly-hydroxyalkyl methacrylates.

7. An article as claimed in claim 1, having an anti-tack coating with a composition falling within the area abcdef of FIG. 2 of the drawings.

* * * * *